United States Patent [19]
Doss

[11] 3,904,660
[45] Sept. 9, 1975

[54] CATIONIC ANTHRAQUINONE DYES
[75] Inventor: Nagib A. Doss, Williamsville, N.Y.
[73] Assignee: Allied Chemical Corporation, New York, N.Y.
[22] Filed: Dec. 15, 1972
[21] Appl. No.: 315,737

[52] U.S. Cl. ............... 260/380; 8/39; 260/247.5 K; 260/272; 260/326.5 C; 260/381
[51] Int. Cl.² ..................... C09B 1/28; C09B 1/50
[58] Field of Search ............ 260/381, 380, 247.5 K, 260/326.5 C, 272

[56]  References Cited
UNITED STATES PATENTS
2,716,655  8/1955  Boyd .................. 260/381
3,123,605  3/1964  Turetzky et al. ...... 260/381
3,281,434  10/1966  Turetzky et al. ...... 260/380
3,646,072  2/1972  James ................ 260/380
3,823,169  7/1974  Staub ................ 260/378

FOREIGN PATENTS OR APPLICATIONS
624,035  7/1961  Canada ............... 260/380
979,869  1/1965  United Kingdom ...... 260/378

OTHER PUBLICATIONS
Chemical Abstracts, Vol. 53, 23055 d, (1959).

Primary Examiner—Robert Gerstl
Assistant Examiner—E. Jane Skelly
Attorney, Agent, or Firm—Anthony J. Stewart; Jay P. Friedenson

[57]  ABSTRACT
Cationic dyes, exhibiting excellent resistance to ozone fading when incorporated into a fiber, having the formula

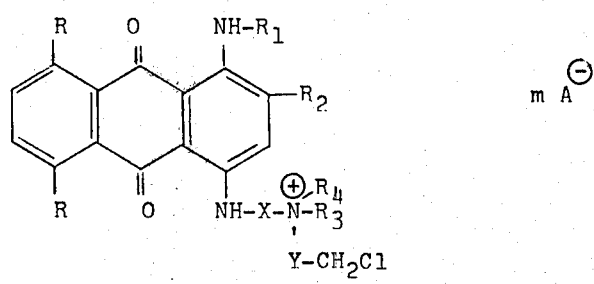

wherein R is H or OH, $R_1$ is H, lower alkyl, phenyl or

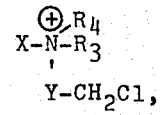

$R_2$ is H, lower alkyl or halogen, $R_3$ and $R_4$ are lower alkyl or together form a morpholino, pyrrolidino or piperidino group, X is alkylene or alkarylene of 1 to 10 carbon atoms, Y is $(CH_2)_n$—Q wherein Q is a divalent alkene radical of 2 to 5 carbon atoms, phenylene,

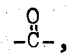

—O—, CHR, or a valence bond, $n$ is an integer of 1 to 4, $m$ is an integer equal to the number of positively charged nitrogen atoms and A is an anion.

13 Claims, No Drawings

CATIONIC ANTHRAQUINONE DYES

Nylon carpeting composed of multi-colored bulked continuous filament (BCF) nylon, has grown rapidly in popularity since its introduction a few years ago. Cationic dyes used for nylon carpeting must have an adequate degree of general fastness properties beside certain specific requirements that make such dyes specialty times. For example, due to the type of texturized nylon, blue dyes should in particular be fast to ozone.

Ozone is generally present in the air at sea level at concentrations of only 1 to 5 parts per hundred million (pphm). Only under conditions of heavy smog, where sunlight acts on a combination of unburned hydrocarbons from gasoline and oxides of nitrogen does the ozone concentration exceed these limits. However, even at these low ozone concentrations, if the humidity is hgih enough, i.e., above about 65%, ozone fading of dyed nylon occurs.

Ozone is a molecular form of oxygen which has 3 atoms of oxygen instead of the normal 2 atoms of oxygen per molecule. It is a very powerful oxidizing agent and a strong electrophilic reagent, that is, it searches out and attacks electron pairs such as exist with carbon to carbon double bonds.

Many dyes have a multiplicity of double bonds, and perhaps for this reason are very sensitive to ozone. The dyes employed for nylon fibers which are most seriously attached are those which are mobile in the nylon, such as cationic and dispersed dyes. The most sensitive dyes are the blue anthraquinone based dyes, although there is evidence that under high humidity and high ozone concentration almost all dyes are effected by ozone.

Ozone fading is not only dependent on the absorbtivity and penetration of ozone to the fiber, but also on the substrate because it is considerably catalyzed by moisture (i.e. high humidity), which in turn is dependent on the crystalinity of the fiber and the way it has been treated. Texturized fibers are usually in a more swollen state which would absorb more water. Nylon 66 (polyhexamethylene adipamide) texturized under dry heat is more resistant to ozone fading than when texturized under steam conditions. Nylon 6 (polycaproaminde) carpet yarn texturized under dry heat or steam conditions is much more susceptible to ozone fading than nylon 66, most probably because of the difference in the crystallinity of the fiber substrate and/or the molecular packing of the fiber resulting in a higher level of openness of the structure of the fiber which in turn causes higher moisture absorbtivity and other observed differences in dye characteristics. As a consequence, the better the dye is maintained in the fiber, with minimum transfer or migration to the surface where the moisture and ozone is readily absorbed, the less the chances for the ozone to react with the dye molecule and destroy the dye.

It is an object of this invention to provide novel cationic anthraquinone dyes.

It is a further object of this invention to provide novel cationic anthraquinones especially suitable for nylon 6 fibers.

It is a still further object of this invention to provide novel cationic anthraquinone dyes which exhibit superior resistance to ozone fading when incorporated into a nylon fiber.

These and other objects will become apparent from the description which follows.

SUMMARY OF THE INVENTION

In accordance with this invention there is provided a cationic dyestuff, exhibiting superior resistance to ozone fading when incorporated into a fiber, having the formula

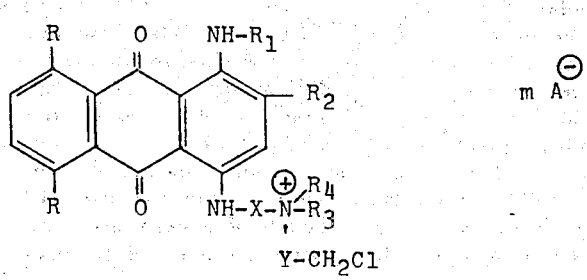

wherein R, individually at each occurrence is H or OH, $R_1$ is H, lower alkyl, phenyl or

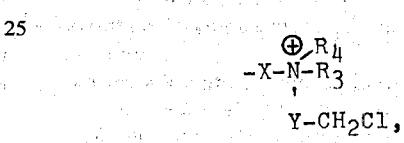

$R_2$ is H, lower alkyl (1 to 4 carbon atoms) or halogen, $R_3$ and $R_4$ are lower alkyl or together form a morpholino, pyrrolidino or piperidino group, X is alkylene or alkarylene of 1 to 10 carbon atoms, Y is $(CH_2)_n$—Q wherein Q is a divalent alkene radical of 2 to 5 carbon atoms, phenylene,

—O—, CHR, or a single valence bond, $n$ is an integer of 1 to 4, $m$ is an integer equal to the number of positively charged nitrogen atoms and A is an anion. These dyes, when incorporated into a fiber, exhibit superior resistance to ozone fading.

DESCRIPTION OF THE INVENTION

As stated above the cationic anthraquinone dyes of this invention exhibit excellent resistance to ozone fading, especially when incorporated into nylon 6. The dyes of this invention which are bis-cationic are similar to the bis-cationic anthraquinone dyes disclosed in U.S. Pat. No. 3,646,072. However, the dyes of this invention are resistant to ozone on cationic dyeable nylon 6 while the dyes of U.S. Pat. No. 3,646,072 are not. The exact reason for the superior resistance to ozone fading of the dyes of the present invention is not known. However, it is theorized that the ozone resistance of the dyes of this invention is due to the presence of the fiber reactive chloromethyl moiety on the dye.

The dyes of the present invention are distinct from the dyes disclosed in U.S. Pat. No. 3,646,072, not only in structure but also in performance.

The dyes of this invention are prepared by conventional processes. For example, to prepare a monocationic dye of the invention, a 1-amino-4-halo anthraquinone, which may be substituted at other positions with constituents falling within the scope of the general formula of the dyes of this invention, is condensed with at least 1 mol of an amine having the formula R₃R₄NXNH₂, in an organic medium which may be a solvent such as ethanol, isopropanol or Cellosolve, or an excess of the amine itself. In preparing bis-cationic dyes of this invention, tetrahydroxy anthraquinone may be condensed with 2 mols of an amine having the formula R₃R₄NXNH₂, in a like manner.

In either case, after the reaction is complete, the pendent tertiary amine group or groups are treated with a quaternizing agent AYCH₂Cl giving the desired cationic dyes. The quaternization is ordinarily carried out in suitable solvents such as propyl or butyl alcohol, toluene, xylene, monochlorobenzene, malonitrile, dimethylformamide, etc. and at temperatures between 0° and 100°C depending on the rate of quaternization and the stability of the chloromethyl group under the reaction conditions.

The starting anthraquinones are well known materials and the selection of any specific reactant will be apparent to those skilled in the art. These include: for mono-cationic dyes; 1-amino-2,4-dibromo-5, 8-dihydroxy-anthraquinone, 1-methylamino-2-methoxy-4-chloroanthraquinone, 1-amino-4-iodoanthraquinone, 1-phenylamino-2-ethoxy-4-bromo-5,8-dihydroxy-anthraquinone, and the like; for bis-cationic dyes; leucoquinizarine or leucotetrahydroxyanthraquinone, either of which may be substituted in the 2- position with a halogen or lower (1–4 carbons) alkyl.

Examples of amines that may be used to prepare the dyes of this invention including the following:

(CH₃)₂N—CH₂CH₂NH₂

(C₄H₉)₂N—CH₂CH₂NH₂

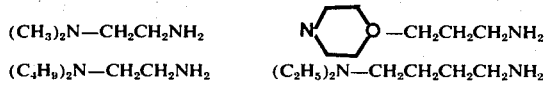

(C₂H₅)₂N—CH₂CH₂CH₂CH₂NH₂

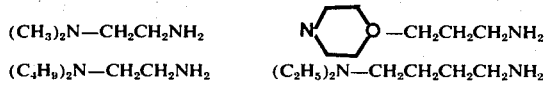—CH₂CH₂NH₂    (C₄H₉)₂N—CH₂CH₂CH₂CH₂NH₂

(CH₃)₂N—CH₂CH₂CH₂NH₂    N⟨ ⟩—CH₂CH₂CH₂CH₂NH₂

(C₃H₇)₂N—CH₂CH₂CH₂NH₂    (CH₃)₂N—CH₂—⟨ ⟩—NH₂

The quaternizing agent employed in the preparation of the dyes of this invention are quaternizing agents which have an additional chloromethyl group besides the reactive quaternization site. As indicated above, the quaternizing agents may be represented by the formula AYCH₂Cl. Exapmles of typical quaternizing agents employed in the preparation of the dyes of this invention are xylylene dichloride, trans-1:4-dichlorobutene, chloroethylsulfate, dichloroethane, 1,4-dibromobutene, xylylenediiodide, 1,3-dichloroacetone, dichloromethyl ether, 1,3-dichloro-2-hydroxy propane, and the like.

As stated above, the dyes of this invention are particularly resistant to ozone fading when incorporated in acid modified nylon 6 as well as nylon 66. The dyes of this invention also possess all around good properties such as improved washfastness, bleed and migration properties These novel dyes are also suitable for use in the dyeing of acid modified nylon styling yarns under acid, neutral or weakly alkaline conditions in deep blue, turquiose, or other similar shades.

The preferred dyes of the present invention are those in which R₁ is $$X-\overset{\oplus}{\underset{|}{N}}\underset{R_3}{\overset{R_4}{\phantom{N}}}$$

$$YCH_2Cl,$$

that is, bis-cationic dyes. Especially preferred are bis-cationic dyes having the formula:

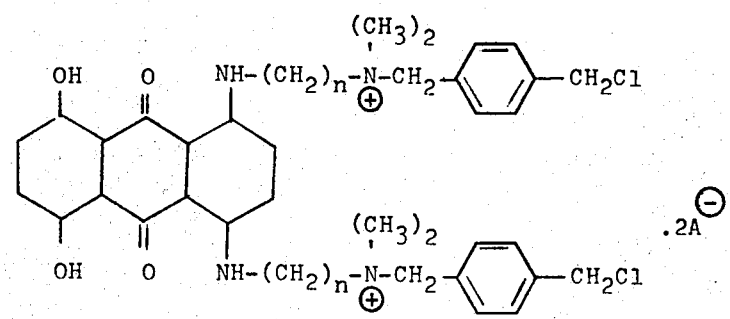

and

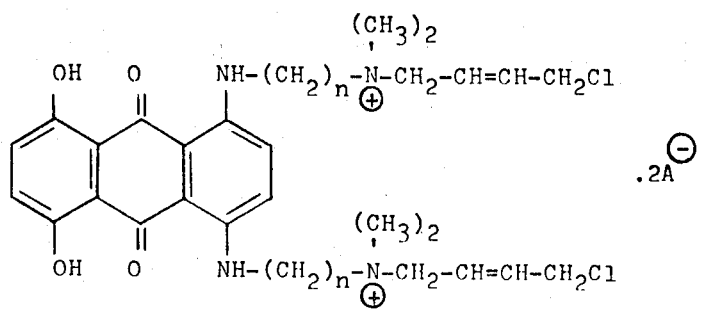

The preferred mono-cationic anthraquinone dyes according to this invention are those having the formula:

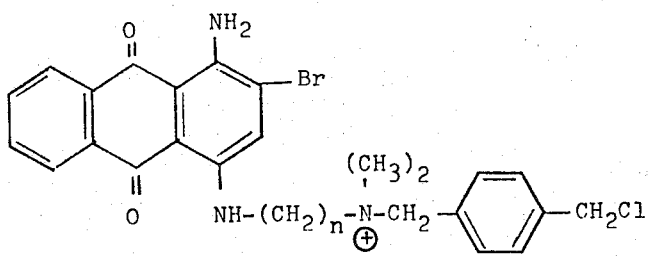

DESCRIPTION OF PREFERRED EMBODIMENTS

The invention will be more fully understood with reference to the following examples which are given by was of illustration only. It is understood that they are not intended to be limiting in any way.

EXAMPLE I

To 0.05 mols of Basic Blue 22 precursor, namely 1-methylamino-4-(N':N'-dimethylpropyl-1'-)aminoanthraquinone, (derived from the interaction of 4-bromo-1-methylamino anthraquinone with N:N-dimethyl 1:3-propanediamine) dissolved in 75 ml monochlorobenzene was added 15g of p-xylene chloride. The reaction mixture was heated slowly to 55°–58°C and stirred for 2 hours at 58°C. The precipitated product was filtered and washed with monochlorobenzene till bleed-free to give on drying 22g of a dye of the structure

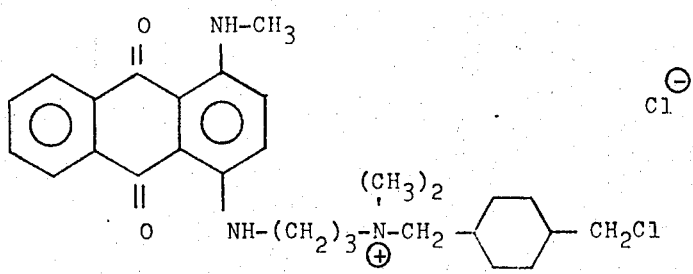

EXAMPLE II 10g of Basic Blue 21 precursor, namely 1-amino-2-bromo-4-(N'-N' dimethylaminopropyl-1'-)aminoanthraquinone (prepared by the interaction of 2:4-dibromo-1-amino-anthraquinone and dimethylaminopropylamine) was stirred with 2.5g of p-xylelene chloride in 50 ml butanol/toluene (3:1) at 55°–60°C for 2 hrs. The precipitated product was filtered and washed with toluene till free of bleed. The dried pure product weighed 5g and had the chemical structure

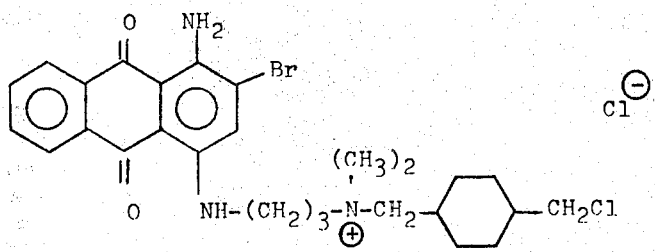

The above dye was incorporated into nylon 6 and found to be of improved ozone resistance versus the parent compound, "Basic Blue 21".

EXAMPLE III

While 25g p-xylene chloride were stirred in 75 ml butanol at 75°C, a solution of 5g of Basic Blue 97 precursor (derived from the condensation of leuco-1,4,5,8-tetrahydroanthraquinone and dimethylamine propylamine) in 50 ml butanol was added dropwise during a period of ½ hour. The reaction mass was further stirred at 80°C for 4 hours. The butanol was partially distilled off under vacuum. On cooling the precipitated product was filtered off and washed with toluene till bleed-free to give the biscationic dye of the structure

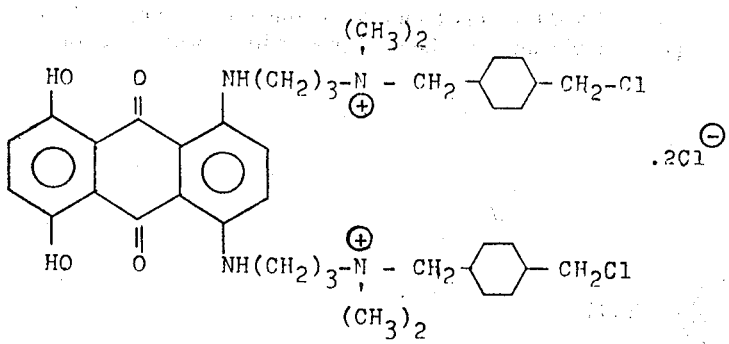

EXAMPLE IV

Trans 1:4 dichlorobutene was used in place of p-xylelene dichloride in Example III to interact with Basic Blue 97 precursor in butanol at 0°C to produce a dye of the chemical composition

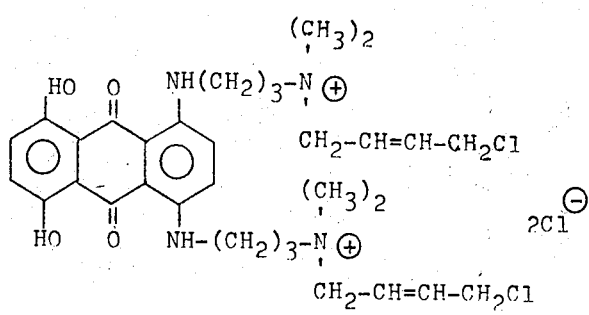

EXAMPLE V

Leuco quinizarine was condensed with N,N-dimethyl-1,3-propane-diamine as described in Example I of U.S. Pat. No. 3,700,398. To 0.1 mol of the clarified reaction mixture at 10°C was added 50 ml of trans 1:4 dichloro-2-butene and stirred overnight at 10°C. The next morning 100 ml of toluene was added slowly and the precipitated product was filtered and dried to give a product of the chemical structure

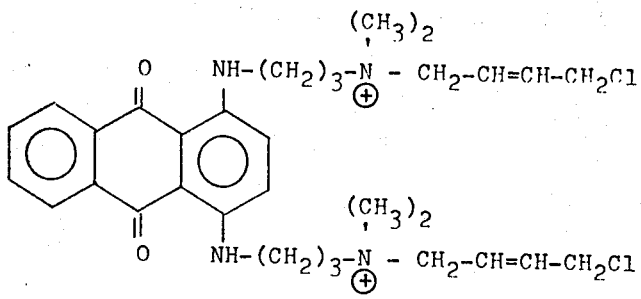

In order to compare the ozone fading properties of the dyes of this invention with previously known ozone resistant dyes, the dyes produced by Examples III and IV, and the preferred dye specie of U.S. Pat. No. 3,646,072, that is the dye illustrated in Column 3, lines 10–18 of that patent, were submitted to an Atlas ozone fading test in the presence of 20 pphm ozone at 104°F and 90% relative humidity. The results are given in Table I which follows. In the Table ΔE refers to the degree of fading of the dye after incorporation into a nylon fiber. Thus, the higher the ΔE the greater the fading of the blue dye toward a yellow color.

TABLE I

| Dye | ΔE 10 Hours | ΔE 20 Hours | ΔE 30 Hours |
| --- | --- | --- | --- |
| U.S. Pat. No. 3,646,072 | 8.4 | 15.7 | 20.9 |
| Example III | 1.8 | 4.8 | 5.6 |
| Example IV | 1.0 | 2.5 | 2.8 |

As can be seen from the Table, the dyes of this invention are unexpectedly significantly superior to previously known ozone resistant dyestuffs.

What is claimed is:

1. A cationic dye having the formula

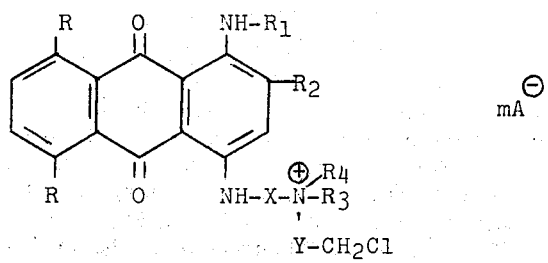

wherein R is H or OH, $R_1$ is H, lower alkyl having 1 to 4 carbon atoms, phenyl or $$X-\overset{\oplus}{\underset{|}{N}}\begin{matrix}R_4\\R_3\end{matrix}$$

$$Y-CH_2Cl,$$

9

$R_2$ is H, lower alkyl having 1 to 4 carbon atoms, chlorine or bromine, $R_3$ and $R_4$ are lower alkyl having 1 to 4 carbon atoms, or together form a morpholino, pyrrolidino or piperidino group, X is alkylene or alkarylene of 1 to 10 carbon atoms, Y is $(CH_2)_n$—Q wherein Q is a divalent alkene radical of 2 to 5 carbon atoms or phenylene, n is an integer of 1 to 4, m is an integer equal to the number of positively charged nitrogen atoms and A is an anion.

2. The cationic dyes defined in claim 1 wherein $R_1$ is H.

3. The cationic dye as defined in claim 2 wherein Q is phenylene.

4. The cationic dye as defined in claim 2 wherein Q is a divalent alkene radical of 2 to 5 carbon atoms.

5. The cationic dye as defined in claim 3 wherein $R_3$ and $R_4$ are lower alkyl.

6. The cationic dye as defined in claim 4 wherein $R_3$ and $R_4$ are lower alkyl.

7. The cationic dye as defined in claim 1 wherein $R_1$ is

10

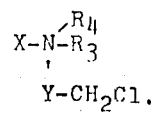

8. The cationic dye as defined in claim 7 wherein is OH.

9. The cationic dye as defined in claim 7 wherein is

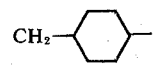

10. The cationic dye as defined in claim 7 wherein is —$CH_2$—$CH$=$CH$—.

11. A cationic dye having the formula

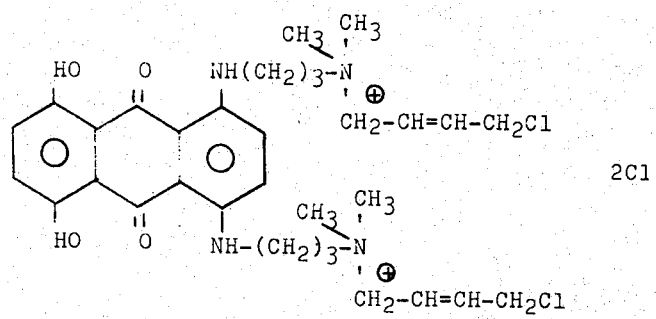

12. A cationic dye having the formula

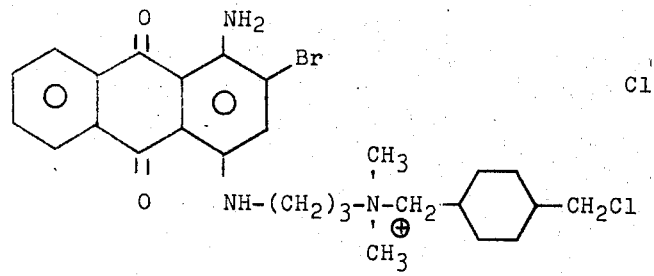

13. A cationic dye having the formula

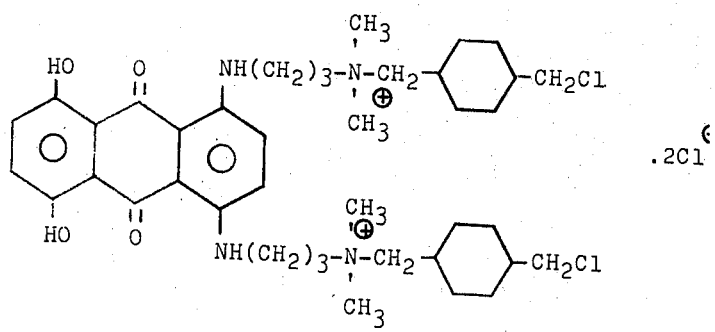

* * * * *

UNITED STATES PATENT AND TRADEMARK OFFICE
CERTIFICATE OF CORRECTION

PATENT NO. : 3,904,660
DATED     : September 9, 1975
INVENTOR(S) : Nagib A. Doss It is certified that error appears in the above-identified patent and that said Letters Patent are hereby corrected as shown below:

Col. 1, line 49, "times." should read --items.-- line 18, "hgih" should read --high--

Col. 3, line 37, "N⌬O" should read -- O⌬N --

Col. 4, line 1, "N⌬" should read --⌬N -- line 3, "N▢" should read --▢N -- line 13, "Exapmles" should read --Examples-- line 25, "properties These" should --properties. These--

Col. 10, line 7, "wherein" should read --wherein R-- line 9, "wherein" should read --wherein Y-- line 14, "CH$_2$" should read -- -CH$_2$ -- line 17, "wherein" should read --wherein Y-- line 28, "2Cl" should read -- 2Cl$^\ominus$ -- line 40, "Cl" should read -- Cl$^\ominus$ -- line 57, ".2Cl" should read -- .2Cl$^\ominus$ --

𝓢igned and 𝓢ealed this twenty-third Day of December 1975

[SEAL]

Attest:

RUTH C. MASON
*Attesting Officer*

C. MARSHALL DANN
*Commissioner of Patents and Trademarks*